US009970769B2

(12) United States Patent
Pfeifle

(10) Patent No.: US 9,970,769 B2
(45) Date of Patent: May 15, 2018

(54) FLEXIBLE ORGANIZATION OF NAVIGATION ATTRIBUTES TO SUPPORT HYBRID NAVIGATION AND DATA STREAMING

(71) Applicant: HERE Global B.V., Eindhoven (NL)

(72) Inventor: Martin Pfeifle, Seewald (DE)

(73) Assignee: HERE Global B.V., Eindhoven (NL)

( * ) Notice: Subject to any disclaimer, the term of this patent is extended or adjusted under 35 U.S.C. 154(b) by 188 days.

(21) Appl. No.: 14/876,318

(22) Filed: Oct. 6, 2015

(65) Prior Publication Data

US 2017/0097238 A1 Apr. 6, 2017

(51) Int. Cl.
*G01C 21/20* (2006.01)
*G06F 17/30* (2006.01)

(52) U.S. Cl.
CPC ....... *G01C 21/20* (2013.01); *G06F 17/30345* (2013.01); *G06F 17/30477* (2013.01)

(58) Field of Classification Search
CPC .............. G01C 21/20; G06F 17/30477; G06F 17/30345
See application file for complete search history.

(56) References Cited

U.S. PATENT DOCUMENTS

| | | | | |
|---|---|---|---|---|
| 6,615,219 B1* | 9/2003 | Bruso | ............... | G06F 17/30067 707/699 |
| 7,440,957 B1* | 10/2008 | Kotidis | ............. | G06F 17/30451 |
| 2009/0030606 A1* | 1/2009 | Pfeifle | ................... | G01C 21/32 701/533 |
| 2009/0119614 A1 | 5/2009 | Tienvieri et al. | | |
| 2009/0276456 A1* | 11/2009 | Neubacher | ........ | G06F 17/30318 |
| 2010/0070448 A1* | 3/2010 | Omoigui | ............. | H01L 27/1463 706/47 |
| 2010/0106695 A1* | 4/2010 | Calder | ................ | G06F 17/3033 707/696 |
| 2010/0106734 A1* | 4/2010 | Calder | ............. | G06F 17/30011 707/758 |
| 2011/0196890 A1 | 8/2011 | Pfeifle et al. | | |
| 2011/0276556 A1* | 11/2011 | Meier | ................. | G06F 17/3087 707/706 |
| 2012/0011178 A1 | 1/2012 | Pfeifle et al. | | |

(Continued)

FOREIGN PATENT DOCUMENTS

EP 2813956 A2 12/2014

OTHER PUBLICATIONS

PCT International Search Report and Written Opinion of the International Searching Authority dated Jan. 4, 2017 for corresponding PCT/EP2016/072689.

*Primary Examiner* — Mussa A Shaawat
(74) *Attorney, Agent, or Firm* — Alston & Bird LLP

(57) ABSTRACT

Methods, apparatuses, and systems are provided which allow for flexible organization of navigation attributes to support hybrid navigation and data streaming. A system may receive a request for geographic data. The system may identify a map attribute from the request. The system may query a metatable with the map attribute for a binary large object entry address, wherein the metatable includes a plurality of binary large object entry addresses. The system may access a navigation database using the binary large object entry address for a binary large object including data for the map attribute. The system may generate a map command including the data for the map attribute.

20 Claims, 11 Drawing Sheets

(56) References Cited

U.S. PATENT DOCUMENTS

| | | |
|---|---|---|
| 2013/0166192 A1 | 6/2013 | Pfeifle et al. |
| 2014/0108462 A1 | 4/2014 | Pfeifle et al. |
| 2014/0372487 A1* | 12/2014 | Pfeifle .................... G01C 21/00 707/793 |
| 2015/0170209 A1* | 6/2015 | Smith .................... G06Q 30/02 705/14.64 |

* cited by examiner

| Attribute | StorageID | DatabaseFile | TableName | BLOBName |
|---|---|---|---|---|
| SPEED_LIMIT | 1 | Routing.NDS | RoutingTileTable | ndsData |
| SPEED_LIMIT | 2 | Routing.NDS | RoutingAuxTileTable | ndsData |
| WEIGHT_METRIC | 1 | Routing.NDS | RoutingAuxTileTable | TruckAttributes |
| CLOTHOID | 1 | Routing.NDS | RoutingAuxTileTable | ADAS |
| ... | | | | |

FIG. 3

| Attribute | StorageAndGroupID | DatabaseFile | TableName | BLOBName |
|---|---|---|---|---|
| SPEED_LIMIT | 1 | Routing.NDS | RoutingTileTable | ndsData |
| TIME_RANGE_OF_DAY | 1 | Routing.NDS | RoutingTileTable | ndsData |
| SPEED_LIMIT | 2 | Routing.NDS | RoutingAuxTileTable | ndsData |
| TIME_RANGE_OF_DAY | 2 | Routing.NDS | RoutingAuxTileTable | ndsData |
| CLOTHOID | 3 | Routing.NDS | RoutingAuxTileTable | ADAS |
| LANE_MASK | 3 | Routing.NDS | RoutingAuxTileTable | ADAS |
| ACCURACY | 3 | Routing.NDS | RoutingAuxTileTable | ADAS |
| ... | | | | |

| Attribute | StorageID | DatabaseFile | TableName | BLOBName |
|---|---|---|---|---|
| SPEED_LIMIT | 1 | HD.NDS | HDTable | SPEEDLIMITS |
| CLOTHOID | 1 | HD.NDS | HDTable | CLOTHOIDS |
| LANE_MARKING | 1 | HD.NDS | HDTable | GeneralAttributes |
| ... | | | | |

500
502 504 506 508 510

FIG. 5 under NDS in relational tables which highlight the relationship between attributes, links, etc. The attributes for links are stored over several BLOBs, which may or may not be in separate locations from each other, in an effort to avoid loading of unnecessary information into a navigation application, HAD system, ADAS system, or ADS system. However, updating particular attributes, or accessing particular attributes may be cumbersome because it requires updating or accessing an entire BLOB.

FLEXIBLE ORGANIZATION OF NAVIGATION ATTRIBUTES TO SUPPORT HYBRID NAVIGATION AND DATA STREAMING

FIELD

The following disclosure relates to a flexible organization of navigation attributes to support hybrid navigation and data streaming, or more particularly, systems and algorithms for accessing, updating, and organizing navigation attributes for hybrid navigation and data streaming.

BACKGROUND

Traditional map navigation applications contain many features. The features themselves contain a wide variety of attributes for the roads, routes, links, or other items that are used in constructing maps by the map navigation applications. Typically, highly automated driving (HAD) databases have an even larger number of attributes due to the requirements of the HAD system which requires the driving decisions to be made by the HAD system. Similarly, advanced driver assistance systems (ADAS) and autonomous driving systems (ADS) may also use databases with a large number of attributes. Modern database systems complying with the Navigation Database Standard (NDS) may store several hundred different attributes. Additionally, links in a database may be grouped together by similar attributes. The attributes are normally stored along with other features in one loading unit. The loading unit might be files or a consecutive unit of bytes in a binary large object within a database file. In NDS these loading units are binary large objects or BLOBs. BLOBs are stored

SUMMARY

The following embodiments provide systems and methods for accessing navigational map data. A method, apparatus, and system are provided which receives routing requests and generates virtual tables on receipt for accessing underlying navigational map data. A virtual table may be used to access the navigational map data. The virtual table may be used to access a variety of different underlying map data through the same type of interface. The type of request for map data may determine how the virtual table is constructed. Using the virtual table the appropriate map data may be extracted from the navigational map data and sent to an end user, a server, or some other system.

In one embodiment, a user of a map developer system wishes to manipulate routing data for a map. The map developer may receive a request for routing data. The request may be characterized by a type. The routing data may be display data, route data, or name data in a navigational map. The map developer may determine the type of request for routing data. The type of requests determines what routing data is to be accessed. The map developer may use a virtual table based on the determination and routing data from a routing database. The virtual table includes a subset of routing data from the routing database. The map developer may access the virtual table using the navigation request to obtain routing data from the routing database. The map developer may send the map tile command to a navigation application or mobile device.

In another embodiment, an apparatus including at least one processor, and at least one memory including computer program code for one or more programs, the at least one memory and the computer program code configured to, with the at least one processor, cause the apparatus to at least perform, receive a request for map route data, wherein the request is characterized by a type, determine the type of request, construct a virtual table based on the type of request and map route data in a routing database, the virtual table including at least a subset of map route data from the routing database, interpret the virtual table using the request for map route data to obtain map route data, and generate a map command based on the obtained map route data in the virtual table.

In another embodiment, a non-transitory computer readable medium is operable to execute instructions for accessing navigational map data. The instructions when executed receive a request for map routing data, wherein the map routing data is characterized by a type, determine the type of request, uses a virtual table based on the type of request and map routing data from a routing database, wherein the virtual table includes a subset of map routing data from the routing database, access the virtual table using the type of request to obtain map routing data, construct a map tile command based on the obtained map route data in the virtual table, and send the map tile command to a mobile device.

BRIEF DESCRIPTION OF THE DRAWINGS

Exemplary embodiments are described herein with reference to the following drawings.

FIG. 3 illustrates an exemplary metatable.

FIG. 4 illustrates an alternative exemplary metatable.

FIG. 5 illustrates another exemplary metatable.

DETAILED DESCRIPTION

Methods, apparatuses, and systems are provided which receive requests for map data, and accessing underlying navigational map data using the same singular non-proprietary interface, such as structured query language (SQL), to access the underlying navigational map data. Navigational functionality may be offered through SQL commands for various kinds of navigation data. By offering functionality through SQL commands map developers may benefit via normalization of the mechanisms by which low-level data of the navigation database and higher-level functionality such as displaying map components are implemented and/or accessed. The commands used to send information to the graphic user interface, the navigation core, as well as the data access layer may all be accessed using SQL commands.

In traditional systems the location (or locations) where attributes are stored is defined in a database format. For example, a portable document format (PDF), or hypertext markup language (HTML) document may define the standard for the database format. However, a metatable may be used to provide the location (or locations) in the navigation database where the attributes are stored. A navigation system may read this metadata table in order to find the location of attributes. Some of the data that may be read from the navigation system may be the number of countries contained in a map, as well as where the navigational data may be found in a database or table. Furthermore, the file names, or file handles, for files that contain the data may be read from tables. Similarly, graphic icons that are needed for navigation requests may be read from tables. Tables might be stored as relational tables, e.g. inside a SQLite database, or even inside a binary large object (BLOB) or in a file. In any case the navigation system may read these data at the beginning of the navigation system operation, i.e. during the initialization of the navigation system. From a software point of view, using metatables to locate the location of the attributes is an efficient solution to locate attributes in BLOBs, compared to a hard coded application which assumes that the attributes are stored in certain positions. In current NDS databases, the location of attributes is predefined. By using a flexible organization to access, store, update, and stream attributes both traditional navigation systems, HAD systems, ADAS systems, and ADS systems may utilize the same format for accessing navigation attributes.

Figure 1:
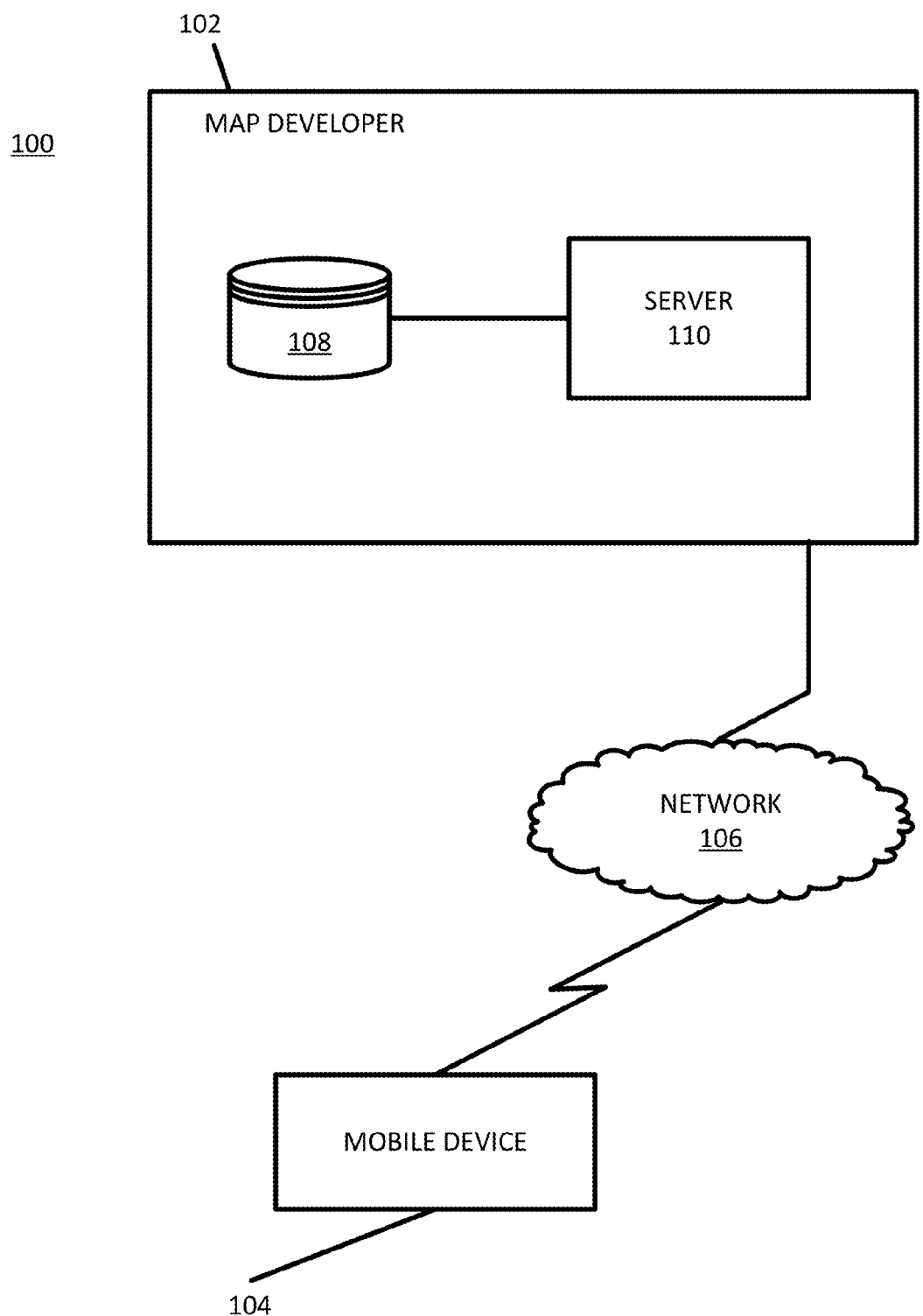
FIG. 1 illustrates an exemplary system for flexible organization of navigation attributes to support hybrid navigation and data streaming.

FIG. 1 illustrates an exemplary architecture/system 100 for flexible organization of navigation attributes to support hybrid navigation and data streaming. The system 100 includes a developer system 102, one or more mobile devices 104, hereinafter "mobile device," and a network 106. Additional, different, or fewer components may be provided. For example, many mobile devices 104 connect with the network 106. The developer system 102 includes a server 110 and one or more databases 108. The system 100 may further include an additional database 114 which is coupled to a separate network 112 from the mobile device 104 and map developer 102. In some embodiments the system 100 may use the methods depicted in FIGS. 7, 9, or 11, for flexible organization of navigation attributes to support hybrid navigation and data streaming.

Database 108 may be geographic databases that store navigational map data collected from one or more mobile devices 104, or navigational map data stored in the database 108 as part of the map developer system 102. In some embodiments, the database 108 may be coupled with the processor 802 of the mobile device 104, or the processor 1002 of the server 110. The navigational map data may include basic map display data, tile data, route data, road data, link data, name data, or historical traffic data that are stored in a table in the database 108. Tile data may refer to data collected by a vehicle, or individual, driving routes in the real world. Tile data may also refer to data that when constituted together make up the map data for a region of a map such as a city, state, county, country, or some combination thereof. The tile data stored in the database 108 may be data related to one or more vehicles traveling along a route or routes. A user of the mobile device may indicate that they wish to receive routing data from point A to point B. The tile data may indicate whether or not road links between adjacent tiles are compatible with each other, and thus able to form a route when pieced together.

The system 100 may receive a request for geographic data. The request may be received by the server 110, or the mobile device 104. The request may be an update request which includes a request for updated data for the navigation database. Similarly, the update request may be a request to update data in the navigation database. Alternatively, the request may be a streaming request which includes a request for routing data. In some embodiments the request originates from a highly automated driving system. In other embodiments the request originates from a mobile navigation device. The request may be for tile data which may be used to build a map for a region of interest, such as a city, county, state, region, country, or some combination thereof. In other embodiments the mobile device 104 receives the request. The request may originate from an end user of the system, such as a driver in a vehicle utilizing a mobile device functioning as a navigation application. Alternatively the request may originate from a server. The request may correspond to an address, a building, a landmark, a point of interest, or some other geographic identifier stored in the database 108.

The system 100 may identify a map attribute from the request. The map attribute may be identified by the mobile device 104, or the server 110. In other embodiments the mobile device 104 or server 110 performs the identification of the map attribute in conjunction with each other. For example, if a request to compute a route is received the system 100 may identify that the following attributes, like speed limit, length of road links, and functional road classes, are needed to compute the route. The system 100 may query a metatable with the map attribute for a binary large object entry address. The querying may be done by the mobile device 104, or the server 110. The metatable may include a plurality of binary large object entry addresses. In some embodiments the metatable may be read and stored into the memory of the navigation application at initialization of the navigation application or map developer. This way the metatable may be accessed during operation for handling requests for geographic data.

The system 100 may access a navigation database using the binary large object entry address for a binary large object including data for the map attribute. The navigation database may be accessed by the mobile device 104, or the server 110. The navigation database may include a number of binary large objects that include the data for map attributes. The binary large objects may be a collection of data, such as map attributes, that are stored as a single entity in a database. The navigation database may include a plurality of binary large object entries. The binary large objects may include images, geographic data, multimedia, three dimensional renderings of map attributes, or any other geographic data necessary for navigation purposes. For example, the navigation database may include binary large objects that include road attributes, vehicle attributes, driving restriction attributes, road geometry attributes, traffic attributes, time attributes, right of way attributes, road connectivity attributes, travel time attributes, or some combination thereof. In some embodiments, the navigation database has metadata, and the metatable is stored in the metadata of the navigation database. The metadata may be stored logically separate from the binary large objects which include map attributes.

In some embodiments, querying the metatable may include accessing the metatable stored at a first service provider, and accessing the navigation database includes accessing the navigation database stored at a second service provider. For example, the navigation application may access a first service provider which stores the metatable. The metatable may include entries which point to a navigation database that is supplied by a second service provider. The system 100 may access both the first service provider to access the metatable to know where to access the corresponding navigation data in the navigation database stored at the second service provider. Similarly, querying the metatable may include accessing the metatable stored at a first service provider, accessing a first navigation database at a second service provider, and accessing a second navigation database at a third service provider. For example, the request may be a routing request which requires speed limits which are stored at the first navigation database at the second service provider, and turn restrictions which are stored at the second navigation database stored at the third service provider. In other embodiments, the metatable and a first navigation database are stored on a first service provider, and a second navigation database may be accessed on a second service provider. Accessing multiple service providers may be required as part of a service oriented architecture (SOA) for a navigation system, where a client device may access data (e.g. navigation data) through a service interface which is platform agnostic. A SOA navigation system architecture may be necessary to provide data as a service (DaaS), where data may be supplied to client devices in a navigation system on demand in an efficient, and affordable manner.

The system 100 may generate a map command including the data for the map attribute. The system 100 may generate the map command by the mobile device 104, or the server 110. In some embodiments the command may be a routing command. The routing command may include a complete route from an origin to a destination that is built using the map attributes stored in the navigation database. The routing command may include instructions for sending the routing command to a mobile navigation device. In other embodiments the command may be an update command. The system 100 may update the navigation database with newer map attribute data. The update command may include instructions for editing the navigation database.

Figure 2:
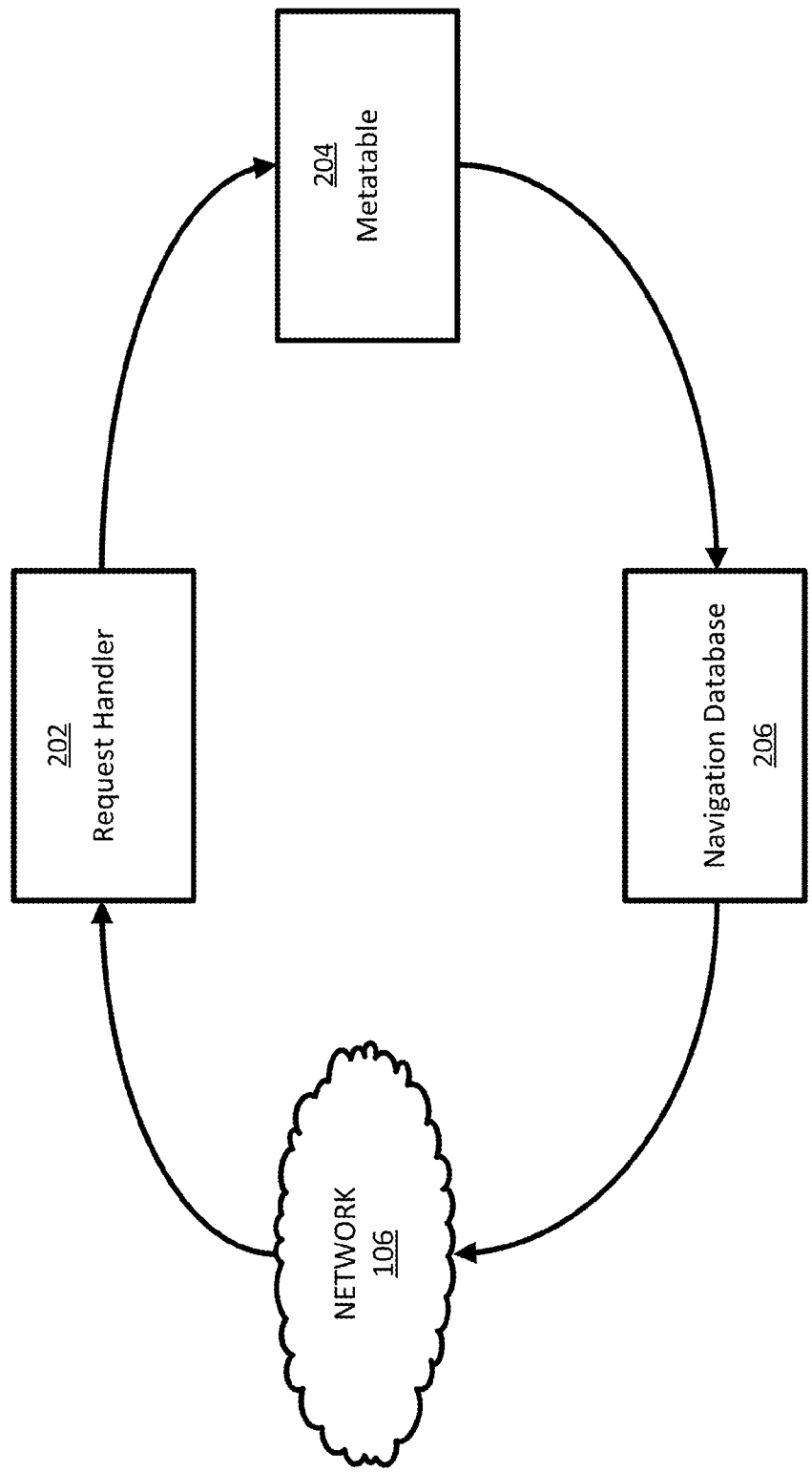
FIG. 2 illustrates an exemplary process for flexible organization of navigation attributes.

FIG. 2 illustrates an example process by which a metatable is used to access a navigation database. FIG. 2 includes a network 106, a request handler 202, a metatable 204, and a navigation database 206. In FIG. 2, a request for geographic data may be received, or transmitted through, the network 106. The request is sent to the request handler 202. The request handler may be part of the mobile device 104, or part of the map developer 102. A map attribute from the request may be identified, and the metatable 204 may be queried with the map attribute. Using a binary large object address entry obtained from the metatable the navigation database 206 may be accessed. The process may include obtaining geographic data from the navigation database and sending the geographic data through the network to the requesting device. In other embodiments, the geographic data may be sent to the request handler, and then sent back through the network to the requesting device.

FIG. 3 illustrates an exemplary metatable 300 which may be used in accordance with the disclosed embodiments. The metatable 300 includes an attribute column 302, a storage identification value (StorageID) column 304, a database file reference (DatabaseFile) column 306, a table name reference (TableName) column 308, and a binary large object name entry (BLOBName) column 310. The Attribute column 302 may include any map attributes that are a part of geographic data used for navigation purposes. In FIG. 3, speed limit, weight metric (which may be the weight of a vehicle such as a truck), and a clothoid are included in the metatable 300. A clothoid may include the geometry of road links, and a description of road links by piecewise description of the shape of the road link. The StorageID column 304 may be an identifier which indicates where a particular attribute may be stored. In the metatable 300, the speed limit attribute may be stored at two different locations and thus occupies two different rows in the metatable and has two different storage ids. For example, the speed limit attribute may be stored at different locations because one BLOB is used for route computation and one BLOB is used for guidance after a route is computed. For each of these use cases the corresponding BLOBs contain only the attributes required for their specific purpose which leads to better performance of the system. The DatabaseFile column 306 may be an indicator for the navigation database where the attribute is stored. The TableName column 308 may be an indicator for the table in the navigation database where the attribute is stored. The BLOBName column 310 may indicate the binary large object where the attribute may be located.

FIG. 4 illustrates an exemplary metatable 400 which may be used in accordance with the disclosed embodiments. The metatable 400 includes an Attribute column 402, a storage and group identification value (StorageAndGroupID) column 404, a database file reference (DatabaseFile) column 406, a table name reference (TableName) column 408, and a binary large object entry (BLOBName) column 410. In the metatable 400 attributes may be stored in groups that are logical in nature. For example, the time range of day attribute and speed limit attribute may be grouped together in the instance where the speed limit is modified by what time of day it is. The grouping may be stored in multiple locations, as is shown in the StorageAndGroupID column in groups 1 and 2. Similarly, the clothoid, lane mask, and accuracy attributes may be part of the same storage group, and as such share the same StorageAndGroupID number.

FIG. 5 illustrates an exemplary an exemplary metatable 500 which may be used in accordance with the disclosed embodiments. The metatable 500 includes an Attribute column 502, a storage identification value (StorageID) column 504, a database file reference (DatabaseFile) column 506, a table name reference (TableName) column 508, and a binary large object entry (BLOBName) column 510. The metatable 500 may be useful for a HAD system, ADAS system, or ADS system because the attributes that may be used by the highly automated driving system may be accessed in a faster more efficient manner if one attribute is stored in a BLOB that only contains the same attributes as that being searched for. For example, the speed limit attribute may be stored in a BLOB named SPEEDLIMITS, and when the HAD system (or ADAS or ADS systems) builds a route which requires the speed limit in an area the HAD system may access the metatable 500 and access the BLOB SPEEDLIMITS.

Figure 6:
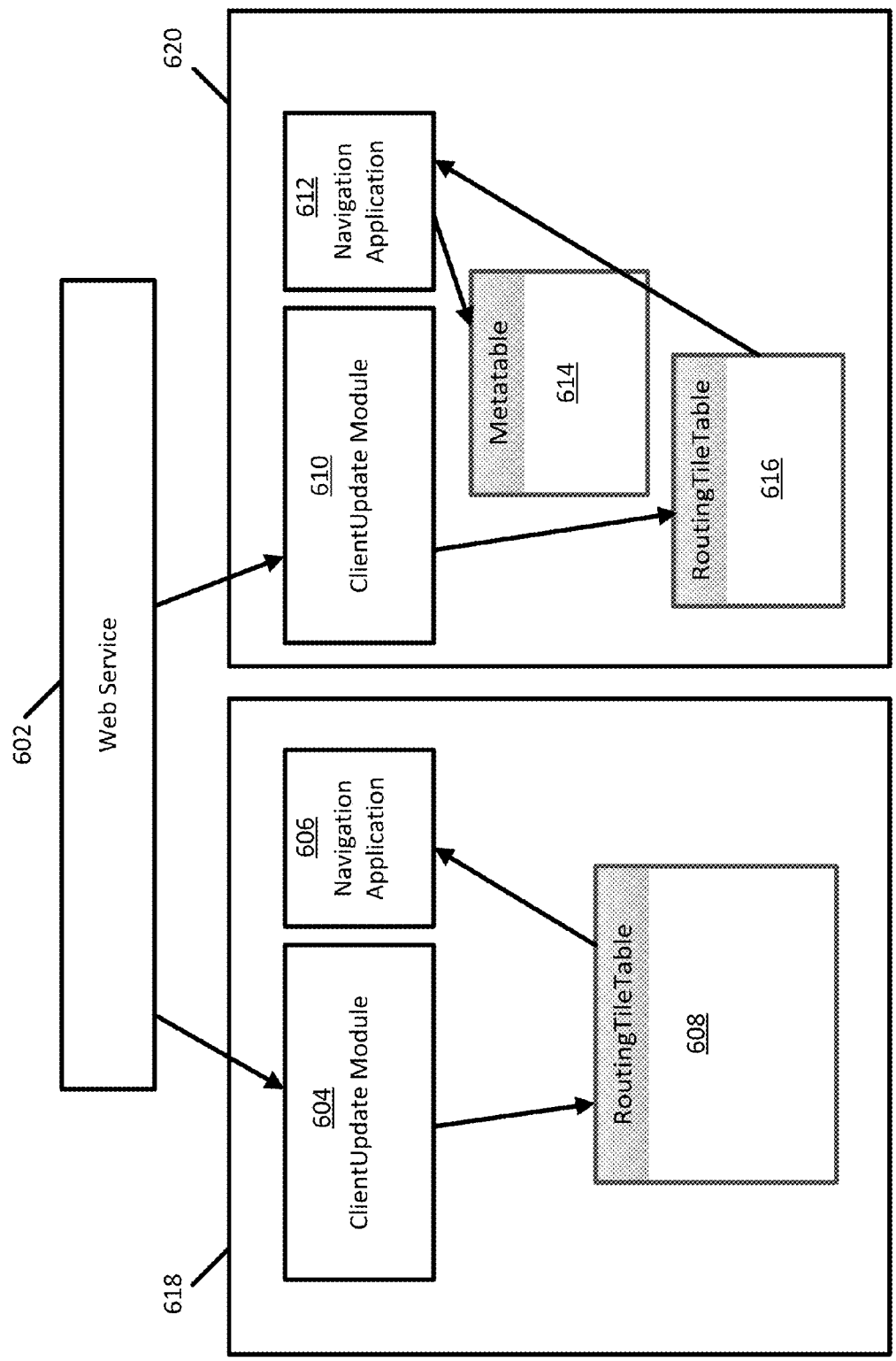
FIG. 6 illustrates an exemplary web service for flexible organization of navigation attributes to support hybrid navigation and data streaming.

FIG. 6 illustrates an exemplary system including web services and client applications. The system includes a web service 602 which may be connected to two different navigation systems 618 and 620. The navigation system 618 may include a ClientUpdateModule 604, a Navigation Application 606, and a RoutingTileTable 608. The navigation system 620 may include a ClientUpdateModule 610, a Navigation Application 612, a Metatable 614, and a RoutingTileTable 616. The components (604, 606, 608, 610, 612, 614, and 616) in the navigation systems 618 and 620 may include one or more service providers, one or more servers, or some combination thereof. In one embodiment, the Web Service 602 may offer or provide a speed limit attribute from the navigation system 618. The ClientUpdateModule 604 reads and parses BLOBs, such as those stored at the RoutingTileTable 608 looking for speed limit attributes. The Navigation Application 606 may read attributes from fixed locations, such as those stored in RoutingTileTable 608. Alternatively, in another embodiment the Web Service 602 offers or provides speed limit attributes from the navigation system 620. In the event of an update request, the ClientUpdate Module 610 may store attributes directly from the web service 602 into the RoutingTileTable 616. In the event of a routing request the Navigation Application 612 may read the Metatable 614 directly at the beginning of the request. Similarly, the Navigation Application 612 may read attribute locations from the metatable 614 at the beginning of a request, and adjust the attribute reading dynamically based on the content of the metadata read from the metatable 614. All of the metatable examples listed above in FIGS. 3, 4, and 5 are capable of being used by the Web Service 602.

Figure 7:
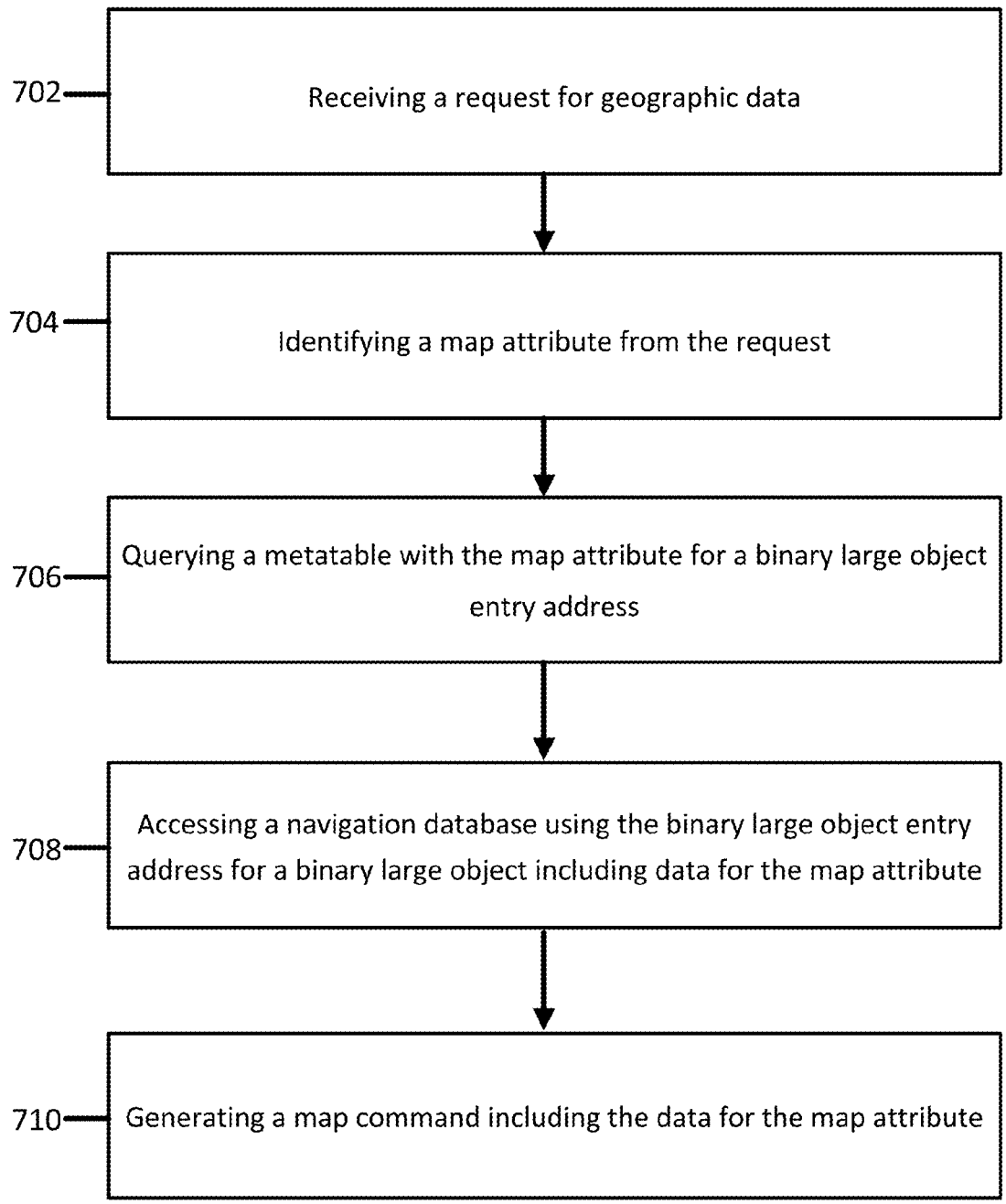
FIG. 7 illustrates an exemplary method for updating and accessing navigation attributes according to the disclosed flexible organization.

FIG. 7 illustrates an exemplary flowchart for accessing navigation attributes according to the disclosed flexible organization using the system of FIG. 1. At 702, a request is received for geographic data. At 704 the system identifies a map attribute from the request. At 706, the system queries a metatable with the map attribute for a binary large object entry address. At 708, the system accesses a navigation database using the binary large object entry address for a binary large object including data for the map attribute. At 710, the system generates a map command including the data for the map attribute.

Figure 8:
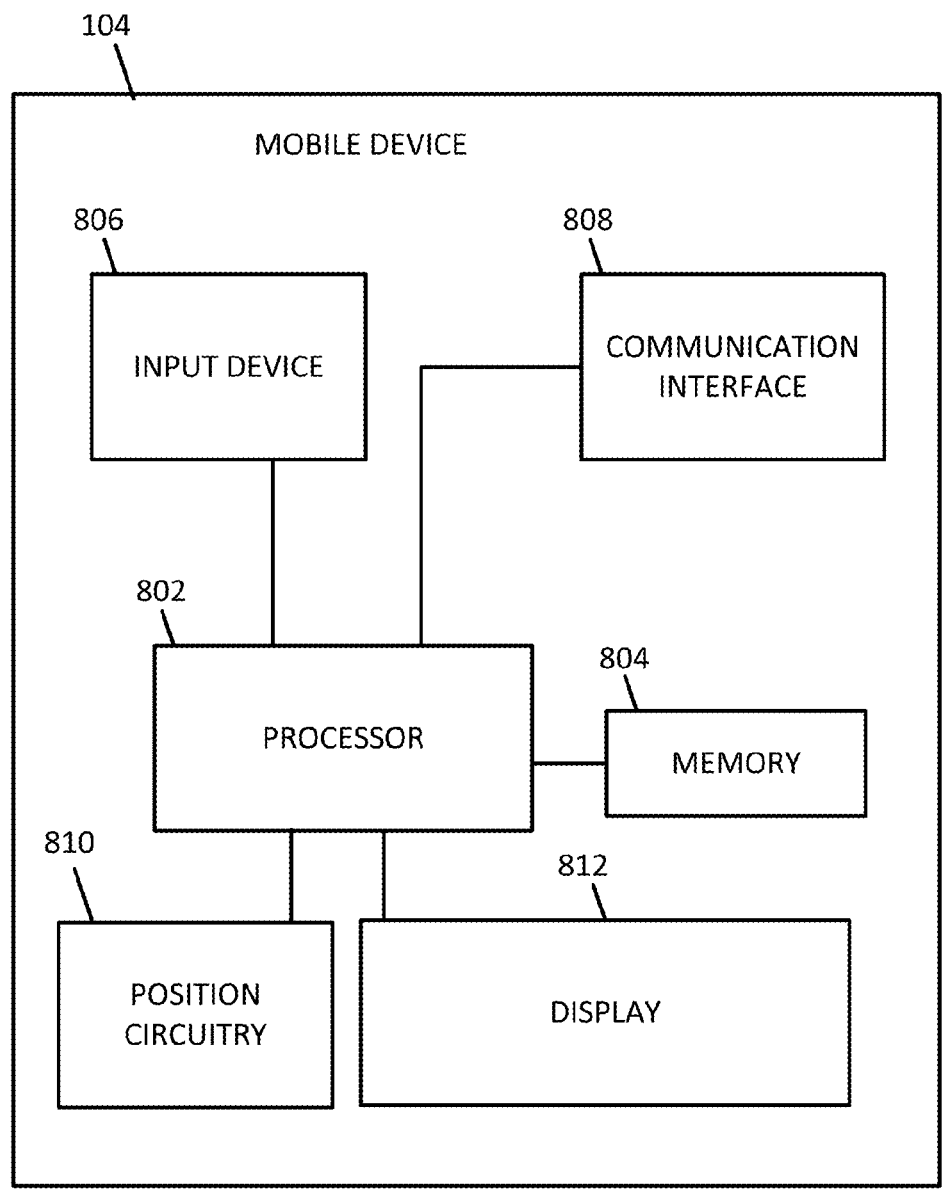
FIG. 8 illustrates an exemplary mobile device for updating and accessing navigation attributes according to the disclosed flexible organization.

FIG. 8 illustrates an exemplary mobile device for updating and accessing navigation attributes according to the disclosed flexible organization. FIG. 8 includes a processor 802, a memory 804, an input device 806, a communication interface 808, a position circuitry 810, and a display 812. Similarly, additional, different, or fewer components are possible for the mobile device 104. The mobile device 104 may be a personal device such as a mobile phone equipped with position circuitry (e.g., global positioning system (GPS)) and an inertial measurement unit (IMU). The position circuitry 810 generates data indicative of the location of the mobile device 104 ("position data"). In addition or in the alternative to GPS, the position circuitry may include a dead reckoning-type system, cellular location, or combinations of these or other systems. The positioning circuitry may include suitable sensing devices that measure the traveling distance, speed, direction, and so on, of the mobile device 104. The positioning system may also include a receiver and correlation chip to obtain a GPS signal.

Figure 9:
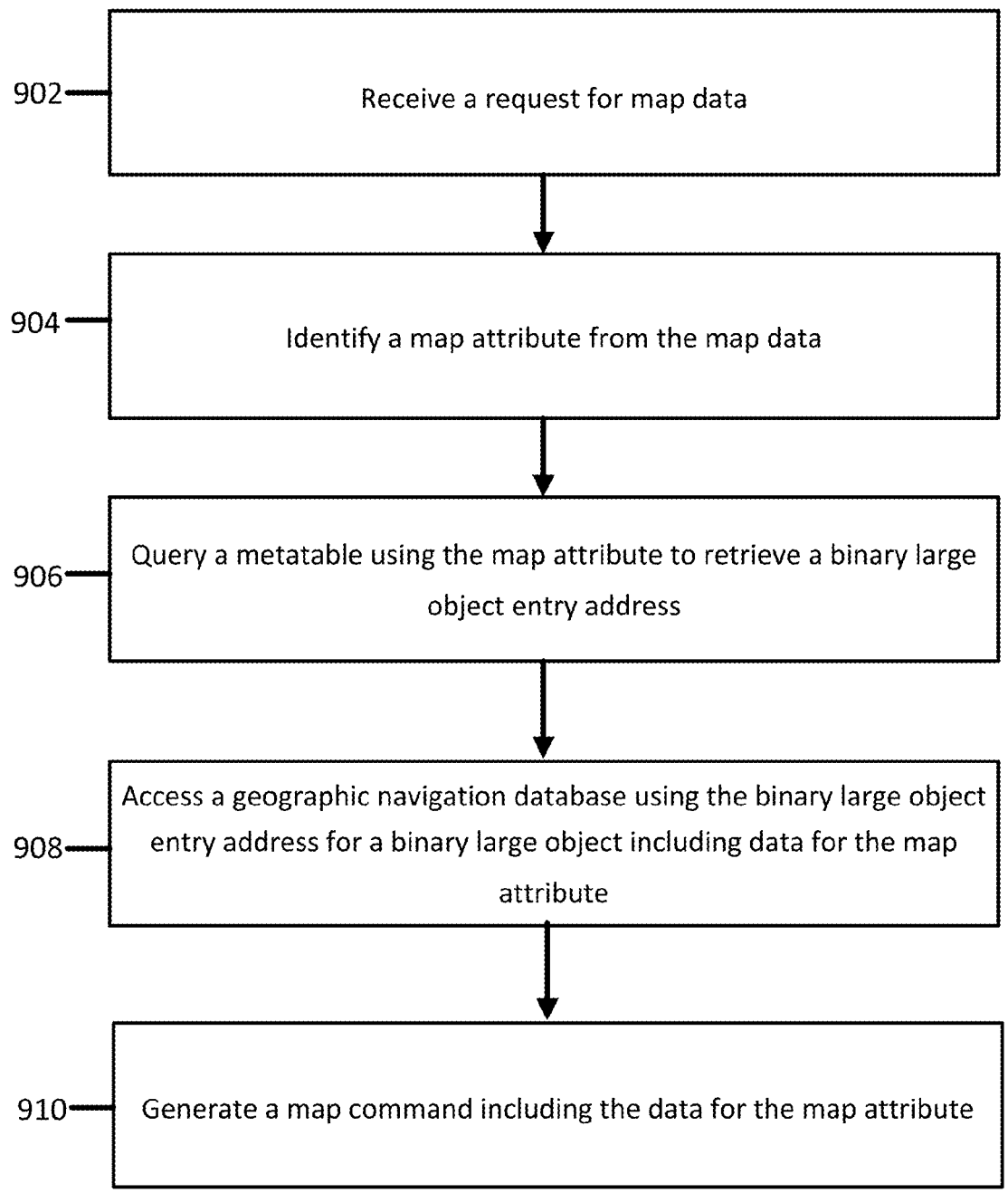
FIG. 9 illustrates an exemplary flowchart for updating and accessing navigation attributes according to the disclosed flexible organization using the mobile device of FIG. 8.

FIG. 9 illustrates an exemplary flowchart for updating and accessing navigation attributes according to the disclosed flexible organization using the mobile device 104 of FIG. 8. The acts may be applied in a different order. Acts may be omitted or repeated. Additional acts may be added. At act 902, the processor 802 or the communication interface 808 may be configured to receive a request for map data. The request for map data may include a route request, an update request, an edit request, or some combination thereof. The route request may be input by the position circuitry 910, the input device 906, a GPS, or other input device integrated with the mobile device 104. The route request may include data from a plurality of map tiles as well as data from a plurality of service providers.

At act 904, the processor 802 may identify a map attribute from the map data. The request may be an update request, a streaming request, or some combination thereof. Other types of requests related to navigation map data may be requested. The identified attribute may be located on located in a navigation database, or in some embodiments the attribute may be stored in a local client cache stored on the mobile device 104.

At act 906, the processor 802 may query a metatable using the map attribute to retrieve a binary large object entry address. In some embodiments, the metatable may have already been loaded into the memory 804 of the mobile device 104 at the initialization of the mobile device 104. The processor may perform this step in conjunction with the memory 804. In some embodiments the processor may query the metatable via the communication interface 810.

At act 908, the processor 802 accesses a geographic navigation database using the binary large object entry address for a binary large object including data for the map attribute. The navigation database may be stored on a server, such as the server 110, at another service provider separate from the system 100 depicted in FIG. 1, or some combination thereof. At act 910, the processor 802 may generate a map command including the data for the map attribute. The processor 802 may generate the map command alone, or in combination with other databases.

Figure 10:
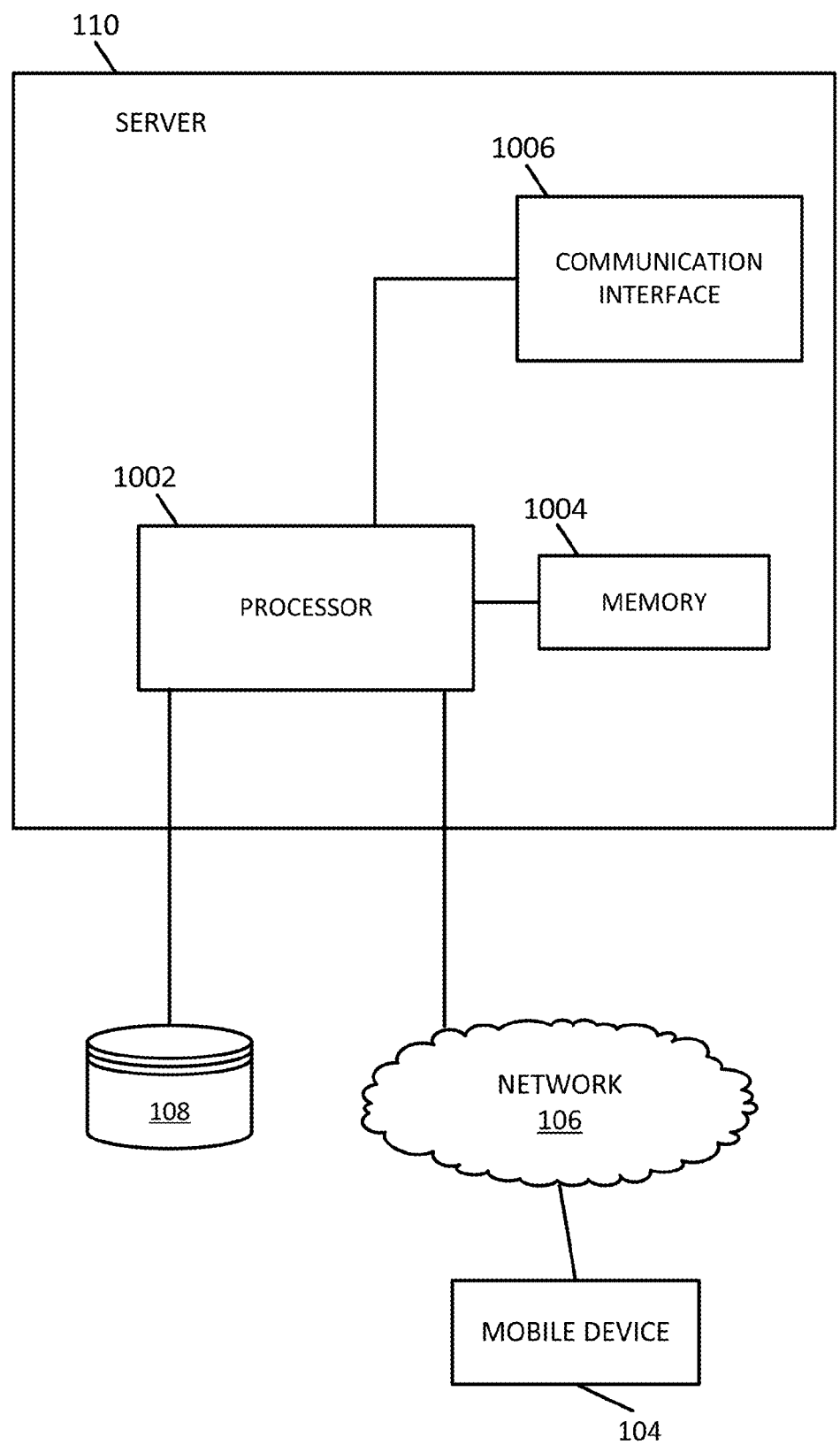
FIG. 10 illustrates an exemplary system for updating and accessing navigation attributes according to the disclosed flexible organization.

FIG. 10 illustrates an exemplary system for updating and accessing navigation attributes according to the disclosed flexible organization. The exemplary server 110 in FIG. 10 includes a processor 1002, a memory 1004, and a communication interface 1006. Map tile commands may be sent from the server 110 to the mobile device 104 upon request, in response to a request for updating and accessing navigation attributes according to the disclosed flexible organization, periodically according to a time schedule, or when the navigation application is initiated (e.g., the map developer edits navigation data functionality on the navigation stack that affects how a deployed mobile device access navigation map data).

Figure 11:
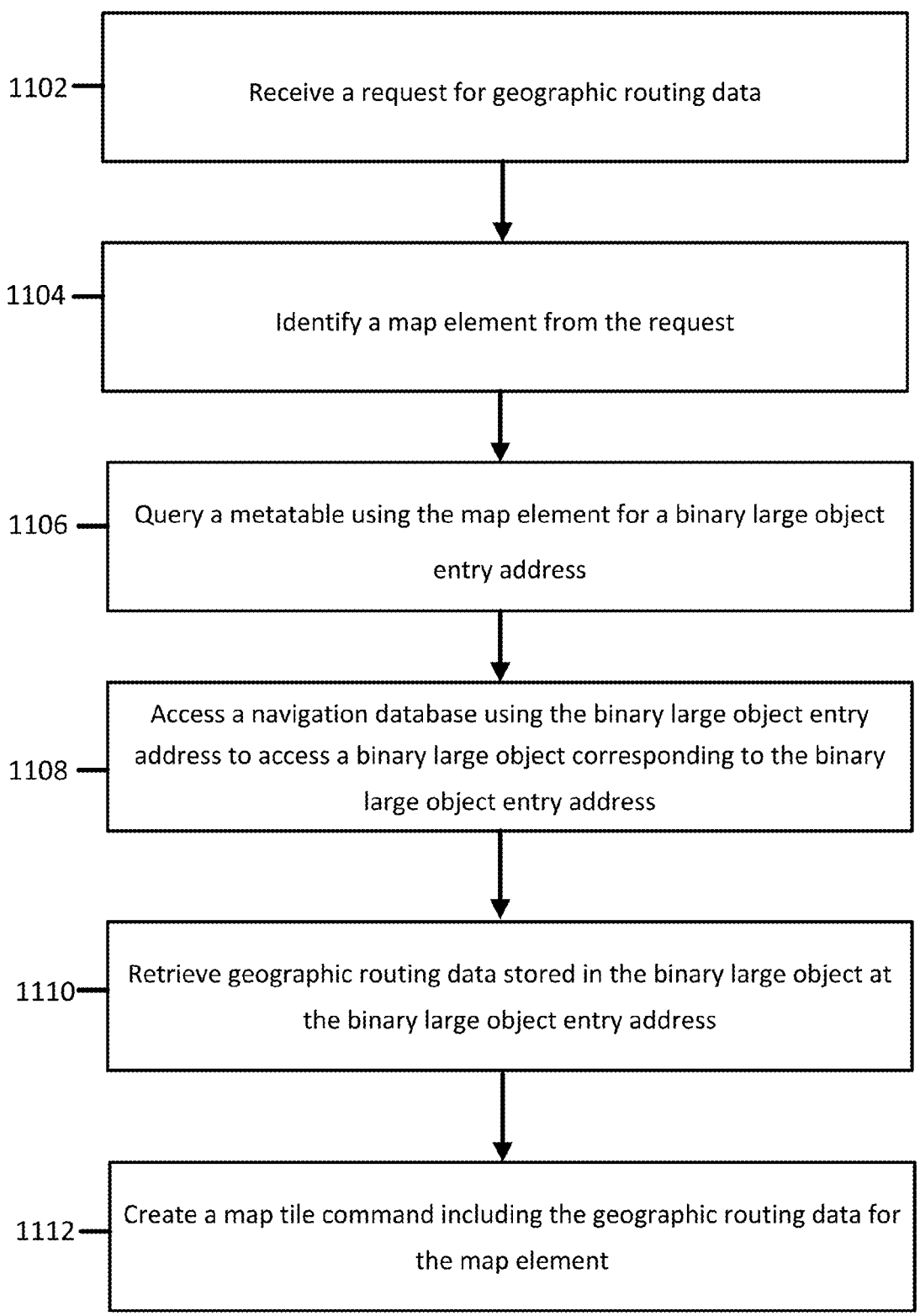
FIG. 11 illustrates an exemplary flowchart for updating and accessing navigation attributes according to the disclosed flexible organization using the system of FIG. 10.

FIG. 11 illustrates an exemplary flowchart for updating and accessing navigation attributes according to the disclosed flexible organization using the system of FIG. 10. The acts of the flowchart in FIG. 11 may alternatively be performed by the server 110, or a group of servers. Different, fewer, or additional acts may be included.

At act 1102, the processor 1002 or communication interface 1006 receives a request for geographic routing data through a network 106. At act 1104, the processor 1002 identifies a map element from the request. The request may be an update request, a streaming request, or some combination thereof.

At act 1106, the processor 1002 may query a metatable using the map element for a binary large object entry address. At act 1108, the processor 1002 accesses a navigation database using the binary large object entry address to access a binary large object corresponding to the binary large object entry address. In act 1110, processor 1002 retrieves geographic routing data stored in the binary large object at the binary large object entry address. The binary large object may include road attributes, vehicle attributes, driving restriction attributes, road geometry attributes, or some combination thereof. At act 1112, the processor 1002 creates a map tile command including the geographic routing data for the map element. In some embodiments the map tile command may be sent to another server, or group of servers.

In addition to the data describe above, the database 108 may include node data records, road segment or link data records, POI data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques).

The road segment data records are links or segments representing roads, streets, or paths, as can be used in the calculated route or recorded route information for determination of one or more personalized routes, according to exemplary embodiments. The node data records are end points corresponding to the respective links or segments of the road segment data records. The road link data records and the node data records represent a road network, such as used by vehicles, cars, and/or other entities. Alternatively, for example, the database 108 may contain path segment and node data records or other data that represent pedestrian paths or areas in addition to or instead of the vehicle road record data.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The database 108 may include data about the POIs and their respective locations in the POI data records. The database 108 can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the database 108 can include event data (e.g., traffic incidents, constructions, scheduled events, unscheduled events, etc.) associated with the POI data records or other records of the database 108.

Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segment data record may also include data that indicate a classification, such as a rank of a road segment that may correspond to its functional class. Example functional classes include arterial roads, collector roads, and local roads. The prerecorded path may include roads outside of the functional classification system. Alternatively, an additional functional classification (e.g., private roads, temporary roads, or personalized roads) may be added to the geographic database to distinguish the prerecorded paths from other segments. Incident rates may be assigned to road segments based on functional classification.

The database 108 may be maintained by a content provider (e.g., a map developer). By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The computing device processor 802 and/or the server processor 1002 may perform any of the calculations described herein. The computing device processor 802 and/or the server processor 1002 may include a general processor, digital signal processor, an application specific integrated circuit (ASIC), field programmable gate array (FPGA), analog circuit, digital circuit, combinations thereof, or other now known or later developed processor. The mobile device processor 802 and/or the server processor 1002 may be a single device or combinations of devices, such as associated with a network, distributed processing, or cloud computing. The computing device processor 802 and/or the server processor 1002 may also be configured to cause an apparatus to at least perform at least one of methods described above.

The memory 804 and/or memory 1004 may be a volatile memory or a non-volatile memory. The memory 804 and/or memory 1004 may include one or more of a read only memory (ROM), random access memory (RAM), a flash memory, an electronic erasable program read only memory (EEPROM), or other type of memory. The memory 804 and/or memory 1004 may be removable from the mobile device 104, such as a secure digital (SD) memory card.

The communication interface 808 and/or communication interface 1006 may include any operable connection. An operable connection may be one in which signals, physical communications, and/or logical communications may be sent and/or received. An operable connection may include a physical interface, an electrical interface, and/or a data interface. The communication interface 808 and/or communication interface 1006 provides for wireless and/or wired communications in any now known or later developed format.

In the above described embodiments, the network 106 may include wired networks, wireless networks, or combinations thereof. The wireless network may be a cellular telephone network, an 802.11, 802.16, 802.20, or WiMax network. Further, the network 106 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method for updating and accessing map attributes stored by a navigation database having flexible organization, the method comprising:
   receiving, by a mobile device comprising a processor and a communication interface, a request for geographic data;
   identifying, by the mobile device, a map attribute from the request;
   querying, by the mobile device, a metatable corresponding to the flexible organization of the navigation database with the map attribute;
   retrieving, by the mobile device, a binary large object entry address from the metatable based on the querying of the metatable with the map attribute, wherein (a) the metatable includes a plurality of map attributes and corresponding binary large object entry addresses, and (b) each binary large object entry address corresponds to a binary large object stored in a computer-readable memory and includes data for the corresponding map attribute;
   accessing, by the mobile device, the navigation database using the binary large object entry address for the binary large object including data for the map attribute; and
   generating, by the mobile device, a map command including the data for the map attribute.

2. The method of claim 1, wherein the request is an update request for updated data for the navigation database.

3. The method of claim 1, where the request is a streaming request for routing data.

4. The method of claim 1, wherein the request originates from a highly automated driving system.

5. The method of claim 1, wherein the request originates from a mobile navigation device.

6. The method of claim 1, wherein querying the metatable includes accessing the metatable stored at a first service provider, and accessing the navigation database includes accessing the navigation database stored at a second service provider.

7. The method of claim 1, wherein the binary large object includes road attributes, vehicle attributes, driving restriction attributes, road geometry attributes, or some combination thereof.

8. The method of claim 1, wherein the navigation database has metadata, and the metatable is stored in the metadata of the navigation database.

9. The method of claim 1, wherein the command is a routing command.

10. The method of claim 9, wherein the routing command includes instructions for sending the routing command to a mobile navigation device.

11. The method of claim 1, where the command is an update command.

12. The method of claim 11, wherein the update command includes an instruction for editing the navigation database.

13. An apparatus comprising:
   at least one processor; and
   at least one memory including computer program code for one or more programs;
   the at least one memory and the computer program code configured to, with the at least one processor, cause the apparatus to at least perform:
   receive a request for map data;
   identify a map attribute from the map data;
   query a metatable corresponding to a flexible organization of a navigation database using the map attribute;
   retrieve a binary large object entry address from the metatable based on the querying of the metatable with the map attribute, wherein (a) the metatable includes a plurality of map attributes and corresponding binary large object entry addresses, and (b) each binary large object entry address corresponds to a binary large object stored in a computer-readable memory and includes data for the corresponding map attribute;
   access the navigation database using the binary large object entry address for the binary large object including data for the map attribute; and
   generate a map command including the data for the map attribute.

14. The apparatus of claim 13, wherein the request may be an update request, a streaming request, or some combination thereof.

15. The apparatus of claim 13, wherein the request originates from a highly automated driving system, a mobile navigation device, or some combination thereof.

16. The apparatus of claim 13, wherein the binary large object includes road attributes, vehicle attributes, driving restriction attributes, road geometry attributes, or some combination thereof.

17. The apparatus of claim 13, wherein the command may be a routing command, an update command, or some combination thereof.

18. A non-transitory computer readable medium comprising instructions that when executed are operable to:
   receive a request for geographic routing data;
   identify a map attribute from the request;
   query a metatable corresponding to a flexible organization of a navigation database using the map attribute;
   retrieve a binary large object entry address from the metatable based on the querying of the metatable with the map attribute, wherein (a) the metatable includes a plurality of map attributes and corresponding binary large object entry addresses, and (b) each binary large object entry address corresponds to a binary large object stored in a computer-readable memory and includes data for the corresponding map attribute;
   access the navigation database using the binary large object entry address to access the binary large object corresponding to the binary large object entry address;
   retrieve geographic routing data stored in the binary large object at the binary large object entry address; and
   create a map tile command including the geographic routing data for the map attribute.

19. The non-transitory computer readable medium of claim 18, wherein the request may be an update request, a streaming request, or some combination thereof.

20. The non-transitory computer readable medium of claim 18, wherein the binary large object includes road attributes, vehicle attributes, driving restriction attributes, road geometry attributes, or some combination thereof.

* * * * *